US007327653B2

United States Patent
Lee

(10) Patent No.: US 7,327,653 B2
(45) Date of Patent: *Feb. 5, 2008

(54) INFORMATION STORAGE MEDIUM HAVING STORAGE LAYER WITH OPTICAL POWER CONTROL AREA, AND RECORDING APPARATUS TO RECORD DATA WITH RESPECT TO INFORMATION STORAGE MEDIUM

(75) Inventor: Kyung-geun Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/432,412

(22) Filed: May 12, 2006

(65) Prior Publication Data

US 2006/0233076 A1 Oct. 19, 2006

Related U.S. Application Data

(63) Continuation of application No. 10/875,794, filed on Jun. 25, 2004.

(30) Foreign Application Priority Data

Jun. 30, 2003 (KR) ............................... 2003-43573

(51) Int. Cl.
*G11B 15/52* (2006.01)
(52) U.S. Cl. .................. 369/47.53; 369/53.27
(58) Field of Classification Search ...................... None
See application file for complete search history.

(56) References Cited

U.S. PATENT DOCUMENTS 5,614,938 A 3/1997 Sugiyama et al.

(Continued)

FOREIGN PATENT DOCUMENTS

| EP | 1124221 | 8/2001 |
| JP | 2000-195054 | 7/2000 |
| WO | WO 00/28532 | 5/2000 |

OTHER PUBLICATIONS

U.S. Appl. No. 10/866,087, filed Jun. 14, 2004, Kyung-geun Lee et al., Samsung Electronics Co., Ltd.

(Continued)

*Primary Examiner*—Paul W. Huber
(74) *Attorney, Agent, or Firm*—Stein, McEwen & Bui, LLP

(57) ABSTRACT

An information storage medium having a plurality of information storage layers, each of which includes an optimal power control (OPC) area for obtaining an optimal recording condition. Optimal power control areas in odd-numbered and even-numbered information storage layers viewed from a direction in which light is incident upon the information storage medium are disposed one on another to not directly face each other. An actually usable area of an optimal power control area in each of the information storage layers varies depending on use circumstances of each of the information storage layers. Therefore, when an OPC area of one information storage layer performs OPC, this OPC does not affect another information storage layer. Also, an area of each of the information storage layers can be efficiently used.

6 Claims, 7 Drawing Sheets

U.S. PATENT DOCUMENTS

2002/0136122 A1* 9/2002 Nakano .................... 369/47.53
2003/0137909 A1* 7/2003 Ito et al. .................. 369/47.14
2003/0185121 A1* 10/2003 Narumi et al. ........... 369/47.53

OTHER PUBLICATIONS

U.S. Appl. No. 10/875,793, filed Jun. 25, 2004, Kyung-geun Lee, Samsung Electronics Co., Ltd.
U.S. Appl. No. 10/875,794, filed Jun. 25, 2004, Kyung-geun Lee, Samsung Electronics Co., Ltd.
U.S. Appl. No. 11/203,184, filed Aug. 15, 2005, Kyung-geun Lee, Samsung Electronics Co., Ltd.
U.S. Appl. No. 10/432,390, filed May 12, 2006, Kyung-geun Lee, Samsung Electronics Co., Ltd.
U.S. Appl. No. 11/432,331, filed May 12, 2006, Kyung-geun Lee, Samsung Electronics Co., Ltd.

* cited by examiner

INFORMATION STORAGE MEDIUM HAVING STORAGE LAYER WITH OPTICAL POWER CONTROL AREA, AND RECORDING APPARATUS TO RECORD DATA WITH RESPECT TO INFORMATION STORAGE MEDIUM

CROSS-REFERENCE TO RELATED APPLICATION

This application is a continuation application of U.S. patent application Ser. No. 10/875,794, filed on Jun. 25, 2004, currently pending. This application also claims the benefit of Korean Patent Application No. 2003-43573, filed on Jun. 30, 2003 in the Korean Intellectual Property Office, the disclosure of which is incorporated herein in its entirety by reference.

BACKGROUND OF THE INVENTION

1. Field of the Invention

The present invention relates to recordable information storage media, and more particularly, to an information storage medium having a plurality of information storage layers, by which an area of the information storage layers can be efficiently used while minimizing an influence of an optimal power control (OPC) process executed in an OPC area, included in each of information storage layers, upon other information storage layers.

2. Description of the Related Art

General information storage media are widely used as information recording media of optical pickup apparatuses for recording/reproducing data in a non-contact way. Optical disks are used as the information storage medium and classified as compact disks (CDs) or digital versatile disks (DVDs) according to their information storage capacity. Examples of recordable, erasable, and reproducible optical disks are 650 MB CD-R, CD-RW, 4.7 GB DVD+RW, and the like. Furthermore, high definition-DVD (HD-DVD) having a recording capacity of 25 GB or greater are under development.

As described above, information storage media have been developed to have a greater recording capacity. The recording capacity of an information storage medium can be increased in two representative ways of: 1) reducing the wavelength of a recording beam emitted from a light source; and 2) increasing the numerical aperture of an objective lens. In addition, there is a way of forming a plurality of information storage layers.

FIGS. 1A and 1B schematically illustrate a dual-layered information storage medium having first and second information storage layers L0 and L1. The first and second information storage layers L0 and L1 include first and second optimal power control (OPC) areas 111 and 121, respectively, for obtaining optimal writing power and first and second defect management area (DMAs) 115 and 125, respectively. The first and second OPC areas 111 and 121 face each other (i.e., the OPC areas are at a common radius relative to an inner or outer boundary of the information storage medium).

Data is recorded in the first and second OPC areas 111 and 121 using various levels of writing power to find the optimum writing power. Hence, data may be recorded with a higher level of power than the optimum writing power. Table 1 shows variations in the jitter characteristics of each of the first and second information storage layers L0 and L1 when data is recorded in the OPC areas 111 and 121 with different levels of writing power.

TABLE 1

|  |  | Normal writing power | | | | Writing power about 20% higher than normal writing power | |
|---|---|---|---|---|---|---|---|
| L0 | | Writing | Unwritten | Writing | Written | Writing | Written |
| L1 | | Unwritten | Writing | Written | Writing | Written | Writing |
| Jitter | L0 | 5.9% | | 6.0% | 5.8% | | 5.9%->6.4% |
|  | L1 | | 6.3% | 6.2% | 6.3% | 6.2% -> 6.3% | |
| Writing | L0 | 6.4 | | 6.3 | 6.3 | 7.5 | 6.4 |
| Power | L1 | | 6.0 | 6.0 | 6.2 | 6.0 | 7.2 |

According to Table 1, if data is recorded with normal writing power, the jitter characteristics of the first or second information storage layer L0 or L1 keep constant. On the other hand, if data is recorded with writing power about 20% higher than the normal writing power, the jitter characteristics of the OPC area of the first or second information storage layer L0 or L1 in which data has already been recorded are degraded. If data is recorded on one of the first and second information storage layers L0 and L1 with writing power more than 20% higher than the normal writing power, it can be expected that the jitter characteristics of the other information storage layer may be further degraded.

Hence, if the first and second OPC areas 111 and 121 of the first and second information storage layers L0 and L1 exist within an equal radius as shown in FIGS. 1A and 1B, one of them may not be usable.

The recording status of one of the first and second OPC areas 111 and 121 may affect the recording characteristics of the other OPC area. For example, as shown in FIG. 1B, if data has been recorded on a part 111a of the first OPC area 111 and no data has been recorded on the residual area 111b thereof, the recording property of a part of the second OPC area 121 which corresponds to the occupied part 111a of the first OPC area 111 is different from that of a part of the second OPC area 121 which corresponds to the unoccupied part 111b of the first OPC area 111. In other words, since the transmittance of a laser with respect to the occupied part 111a of the first OPC area 111 is different from the transmittance of a laser with respect to the unoccupied part 111b thereof, the recording property of the second OPC area 121 may be irregular over the area.

As described above, if the first and second OPC areas are disposed within an equal radius, they may not properly function.

SUMMARY OF THE INVENTION

According to an aspect of the present invention, there is provided an information storage medium having a plurality of information storage layers, by which an area of the information storage layers can be efficiently used while minimizing an influence of optimal power control (OPC) executed in an OPC area included in each of information storage layers upon other information storage layers.

According to an aspect of the present invention, there is provided an information storage medium having a plurality of information storage layers, each of which includes an optimal power control area for obtaining an optimal recording condition, wherein the optimal power control areas in odd-numbered and even-numbered information storage layers are disposed within different radiuses of the information storage medium and the size of an actually usable area of an optimal power control area in each of the information storage layers varies depending on use circumstances of each of the information storage layers.

According to another aspect of the present invention, there is provided an information storage medium having a plurality of information storage layers, each of which includes an optimal power control area for obtaining an optimal recording condition, wherein the optimal power control areas in odd-numbered and even-numbered information storage layers are disposed within different radiuses of the information storage medium and one of the odd-numbered and even-numbered information storage layers includes a usable area for a predetermined purpose that faces the optimal power control area of the other information storage layer.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the present invention will become more apparent by describing in detail exemplary embodiments thereof with reference to the attached drawings of which.

DETAILED DESCRIPTION OF THE EMBODIMENTS

Figure 1A:
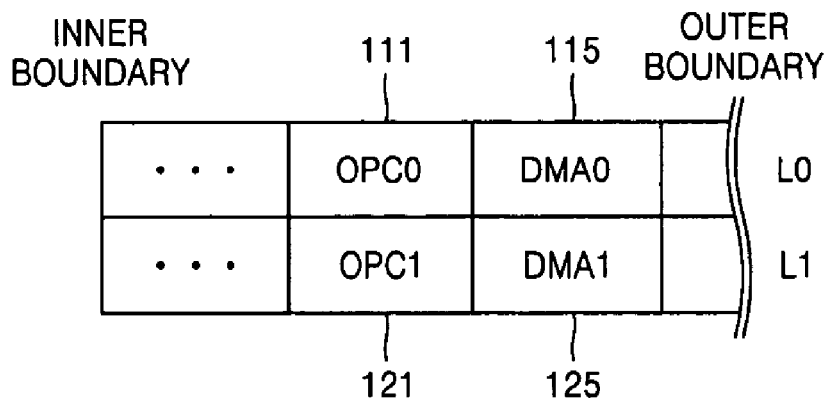
FIGS. 1A and 1B are views illustrating an influence of an optimal power control (OPC) area upon an area other than the OPC area in a conventional dual-layered information storage medium.
Figure 1B:
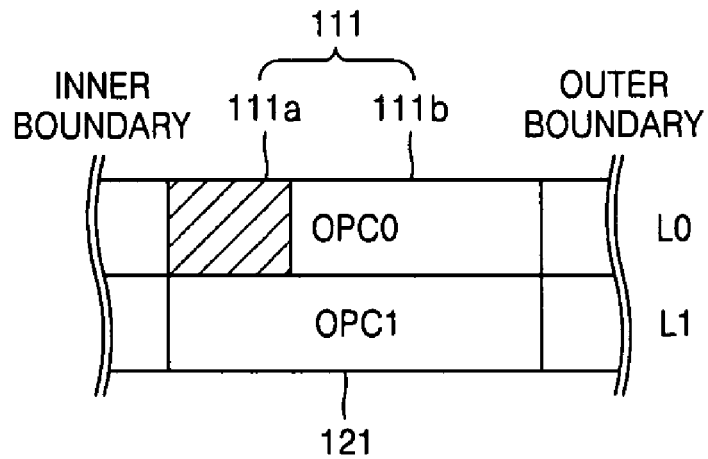

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
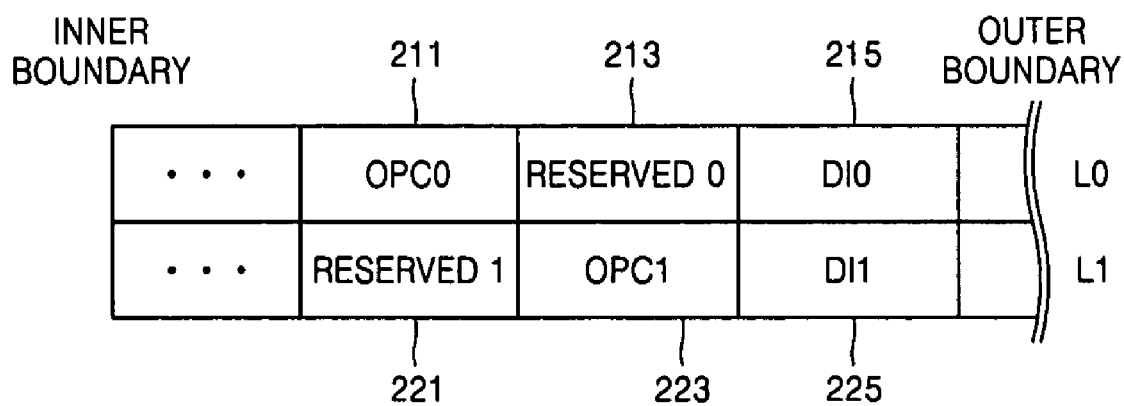
FIG. 2 illustrates a layout of a data area of a dual-layered information storage medium according to an embodiment of the present invention.

Referring to FIG. 2, an information storage medium according to an embodiment of the present invention includes at least two information storage layers L0 and L1. Each of the information storage layers L0, L1 includes an optimal power control (OPC) area 211, 223 for obtaining optimal power and a reserved area 213, 221. The OPC areas 211, 223 of the information storage layers L0, L1 are disposed within different radii such as not to face each other. Although not shown, each of the information storage layers may include a map area adjacent to the OPC area 211, 223.

The information storage medium shown in FIG. 2 includes first and second information storage layers L0 and L1. The first information storage layer L0 includes a first OPC area 211, a first reserved area 213, and a first disk information (DI) area 215. The second information storage layer L1 includes a second reserved area 221, a second OPC area 223, and a second DI area 225. The first and second DI areas 215 and 225 store data that is updated upon every data recording, such as, an address of a used part of an OPC area, information about a status of an information storage layer, and the like. Examples of the information about a status of an information storage layer include a recording mode, and an address recorded last according to a recording mode.

The first and second OPC areas 211 and 223 in the information storage layers L0 and L1 are disposed within different radii of the information storage medium such that the first and second OPC areas 211 and 223 do not face each other. More specifically, the second reserved area 221 is disposed in an area of the second information storage layer L1 opposite to the first OPC area 211 of the first information storage layer L0, and the first reserved area 213 is disposed in an area of the first information storage layer L0 opposite to the second OPC area 223 of the second information storage layer L1.

The first and second DI areas 215 and 225 of the first and second information storage layers L0 and L1, respectively, are disposed within an identical radius of the information storage medium. Defect management areas (DMAs) may be used instead of or in addition to the DI areas 215 and 225.

Figure 3A:
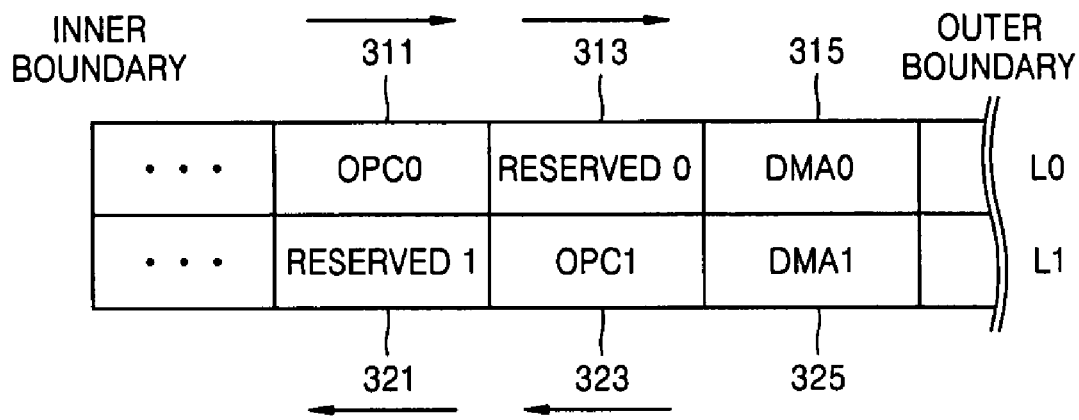
FIGS. 3A and 3B illustrate a layout of a data area of a dual-layered information storage medium according to another embodiment of the present invention.
Figure 3B:
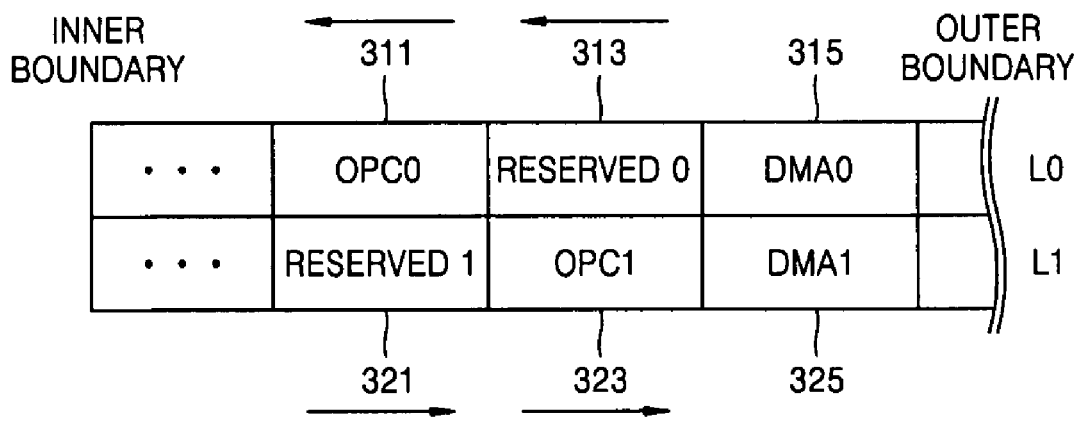

FIGS. 3A and 3B illustrate an information storage medium according to another embodiment of the present invention, in which the first information storage layer L0 includes a first OPC area 311, a first reserved area 313, and a first disk management area (DMA) 315, and the second information storage layer L1 includes a second reserved area 321, a second OPC area 323, and a second DMA 325.

Referring to FIGS. 3A and 3B, directions of data recording in each OPC area 311, 323 and a reserved area 313, 321 of each information storage layer L0, L1, (i.e., directions of the use of the OPC area 311, 323 and the reserved area 313, 321) are identical. In other words, while data is recorded in an OPC area 311, 323 and a reserved area 313, 321 of each information storage layer L0, L1 in an identical direction, data is recorded in facing areas of different information storage layers L0, L1 in opposite directions. That is, the facing areas of different information storage layers L0, L1 are used in opposite directions so that they are not used together upon data recording.

In FIG. 3A, regardless of a track spiral direction of the information storage medium, data is recorded in the first OPC area 311 and the first reserved area 313 of the first information storage layer L0 in an identical direction from an inner boundary to an outer boundary of the information storage medium. In other words, the first OPC area 311 and the first reserved area 313 are used in the identical direction from the inner boundary to the outer boundary of the information storage medium. Data is recorded in the second reserved area 321 and the second OPC area 323 of the second information storage layer L1 in an identical direction from the outer boundary to the inner boundary of the information storage medium. In other words, the second reserved area 321 and the second OPC area 323 are used in the identical direction from the outer boundary to the inner boundary of the information storage medium. Thus, the facing OPC and reserved areas of the first and second storage layers L0 and L1 are used in opposite directions.

In FIG. 3B, regardless of the track spiral direction of the information storage medium, data is recorded in the first OPC area 311 and the first reserved area 313 of the first information storage layer L0 in the identical direction from the outer boundary to the inner boundary of the information storage medium. In other words, the first OPC area 311 and the first reserved area 313 are used in the identical direction from the outer boundary to the inner boundary of the information storage medium. Data is recorded in the second reserved area 321 and the second OPC area 323 of the second information storage layer L1 in the identical direction from the inner boundary to the outer boundary of the information storage medium. In other words, the second reserved area 321 and the second OPC area 323 are used in the identical direction from the inner boundary to the outer boundary of the information storage medium, but opposite the direction of use of the first OPC area 311 and the first reserved area 313.

Figure 4A:
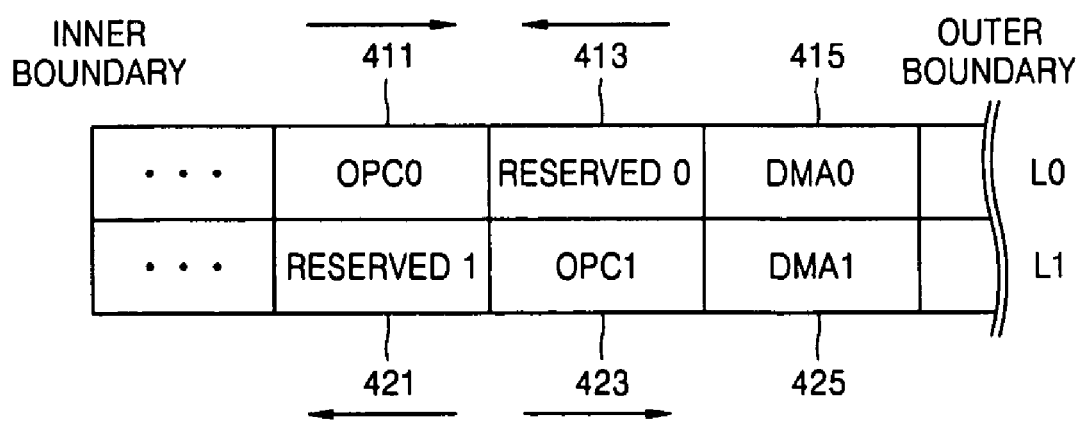
FIGS. 4A and 4B illustrate a layout of a data area of a dual-layered information storage medium according to another embodiment of the present invention.
Figure 4B:
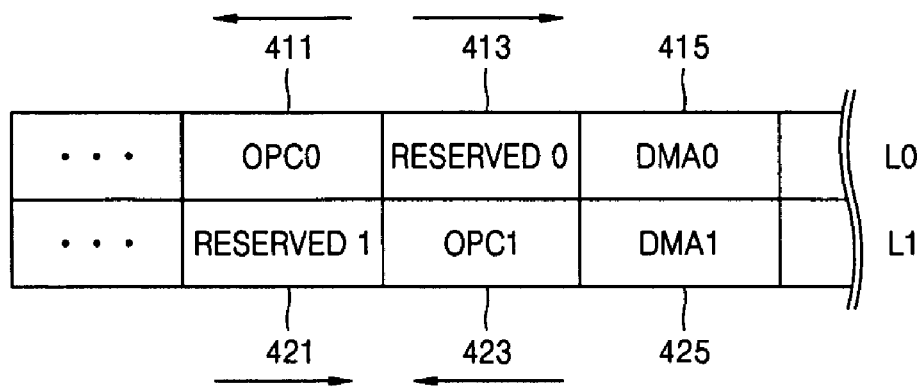

FIGS. 4A and 4B illustrate an information storage medium according to another embodiment of the present invention, in which the first information storage layer L0 includes a first OPC area 411, a first reserved area 413, and a first DMA 415, and the second information storage layer L1 includes a second reserved area 421, a second OPC area 423, and a second DMA 425.

Referring to FIGS. 4A and 4B, directions of data recording in an OPC area 411, 423 and a reserved area 413, 421 of each information storage layer L0, L1 (i.e., directions of the use of the OPC area 411, 423 and the reserved area 413, 421) are opposite. In other words, while data is recorded in an OPC area 411, 423 and a reserved area 413, 421 of each information storage layer L0, L1 in opposite directions, data is recorded in facing areas of different information storage layers in opposite directions. That is, the facing areas of different information storage layers are used in opposite directions so that they are not used together upon data recording.

In FIG. 4A, regardless of the track spiral direction of the information storage medium of FIG. 2, directions of data recording in a first OPC area 411 and a first reserved area 413 of a first information storage layer L0 are opposite. That is, directions of the use of the first OPC area 411 and the first reserved area 413 are from an inner boundary to an outer boundary of the information storage medium and from the outer boundary to the inner boundary, respectively. Directions of data recording in a second reserved area 421 and a second OPC area 423 of a second information storage layer L1, that is, directions of the use of the second reserved area 421 and the second OPC area 423, are from the outer boundary to the inner boundary of the information storage medium and from the inner boundary to the outer boundary, respectively.

In FIG. 4B, regardless of the track spiral direction of the information storage medium, directions of data recording in the first OPC area 411 and the first reserved area 413 of the first information storage layer L0, (i.e., directions of the use of the first OPC area 411 and the first reserved area 413) are from the outer boundary to the inner boundary of the information storage medium and from the inner boundary to the outer boundary, respectively. Directions of data recording in the second reserved area 421 and the second OPC area 423 of the second information storage layer L1, (i.e., directions of the use of the second reserved area 421 and the second OPC area 423) are from the inner boundary to the outer boundary of the information storage medium and from the outer boundary to the inner boundary, respectively.

In FIGS. 3A and 3B or FIGS. 4A and 4B, it is understood that the order of the OPC area and the reserved area arranged in each of the first and second information storage layers L0 and L1 may be inverted according to different aspects.

In the information storage media of FIGS. 3A and 3B and FIGS. 4A and 4B, addresses of used parts of the first OPC areas 311 and 411 and the second OPC areas 323 and 423 are recorded in the first reserved areas 313 and 413 and the second reserved areas 321 and 421, respectively. Hence, the size of an actually usable area of an OPC area of an information storage layer varies by a used area of a reserved area of an adjacent information storage layer depending on the environments of the use of each information storage layer, for example, depending on a type of data recorded in each information storage layer or a frequency of the use of each information storage layer.

FIGS. 5A through 5D illustrate an information storage medium according to another embodiment of the present invention, which includes map areas 512, 522 for storing addresses of used parts of the OPC areas 511, 523 in information storage layers L0 and L1 are disposed adjacent to the OPC areas 511, 523. In contrast with FIGS. 3A and 3B and FIGS. 4A and 4B, a reserved area allocated in each of the information storage layers L0 and L1 is used for a purpose other than the storage of the addresses of used parts of the OPC areas 511, 523. When such a map area is disposed adjacent to an OPC area 511, 523 in each information storage layer as described above, a usable part of the OPC area 511, 523 can be rapidly identified before the OPC is performed in each information storage layer L0, L1. Thus, a time required to perform the OPC can be shortened.

The addresses of the OPC areas 511, 523 may be recorded in the map area in various forms, for example, in the form of a bitmap. The map area 512, 522 may be replaced by a disk information (DI) area which can store not only OPC information but also information updated upon every data recording, for example, an address finally recorded in a user area or the like.

In FIGS. 5A through 5D, the first information storage layer L0 includes a first OPC area 511, a first map area 512, a first reserved area 513, and a first DMA 515, and the second information storage layer L1 includes a second reserved area 521, a second map area 522, a second OPC area 523, and a second DMA 525. The first and second map areas 512 and 522 are disposed within an identical radius of the information storage medium, and the first and second DMAs 515 and 525 are similarly situated on a different radius of the information storage medium.

Figure 5A:
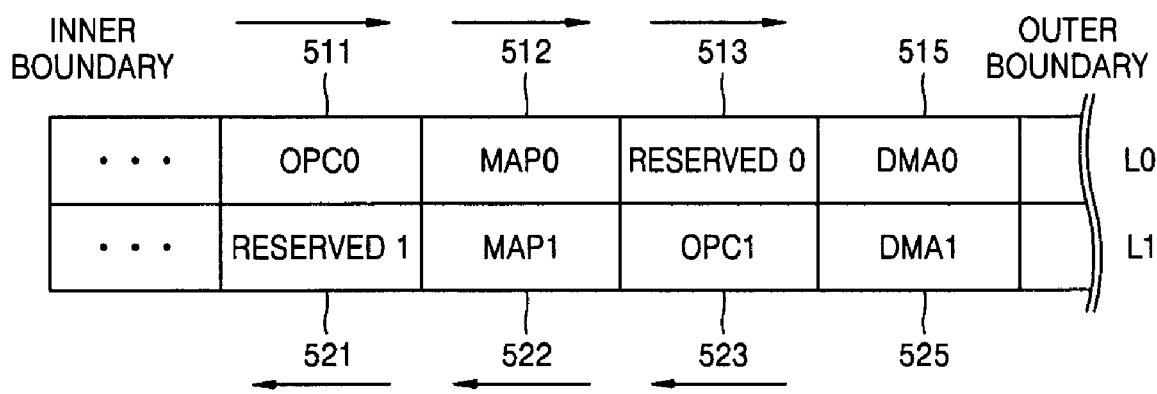
FIGS. 5A through 5D illustrate a layout of a data area of a dual-layered information storage medium according to another embodiment of the present invention.
Figure 5B:
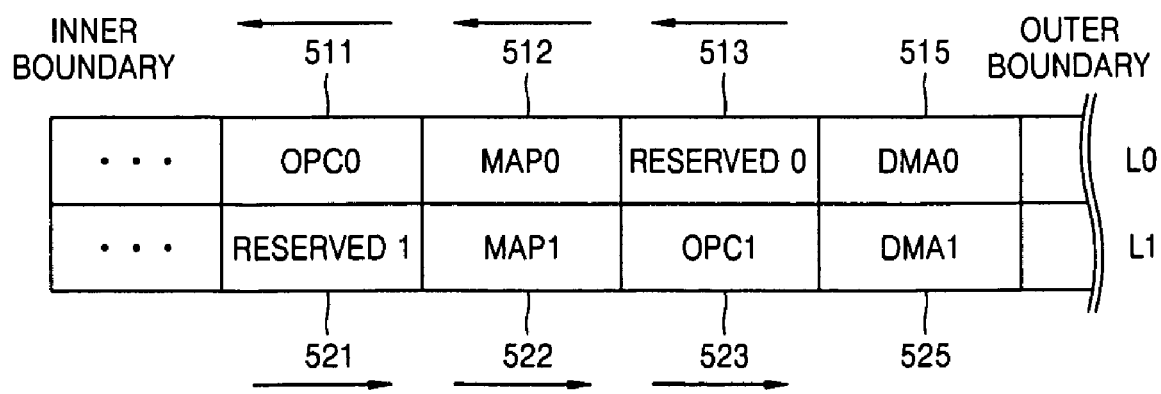
Figure 5C:
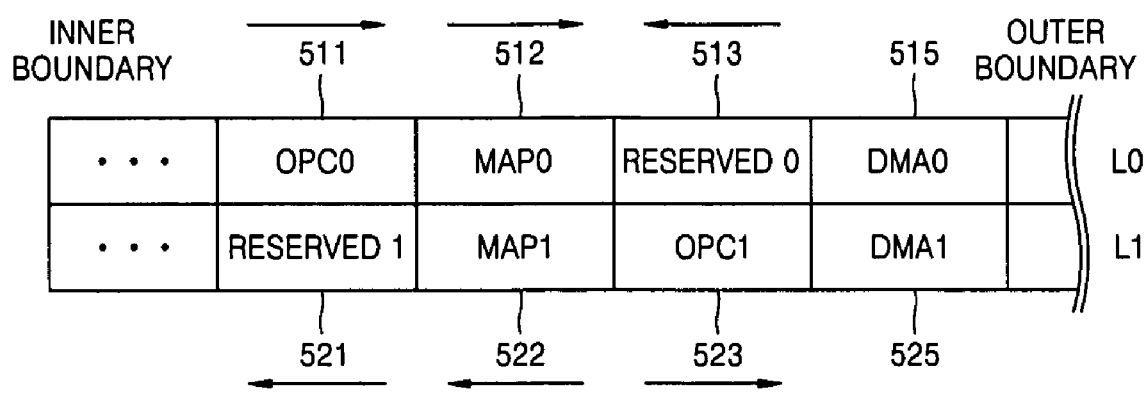
Figure 5D:
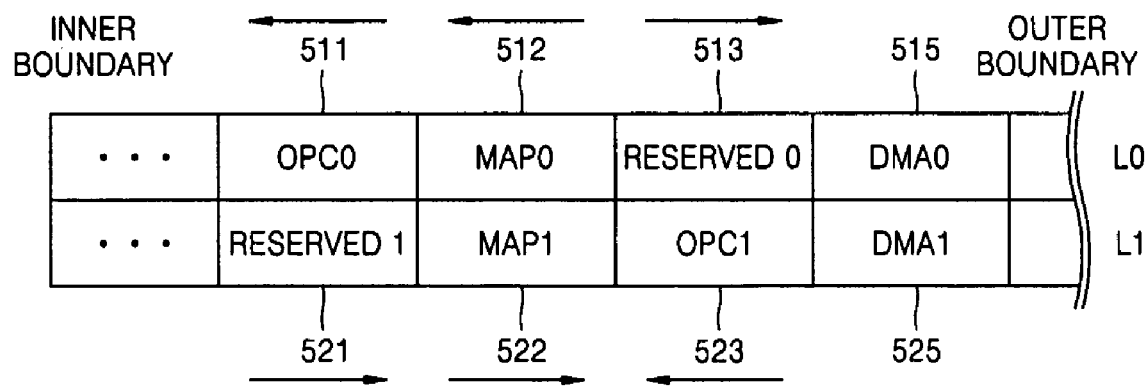

Generally, the information storage media illustrated in FIGS. 5A and 5B are formed by further allocating the first and second map areas 512 and 522 in the information storage media of FIGS. 3A and 3B. The information storage media illustrated in FIGS. 5C and 5D are formed by further allocating the first and second map areas 512 and 522 in the information storage media of FIGS. 4A and 4B. As described above, the reserved areas 513, 521 illustrated in FIGS. 5A through 5D are not used to store data updated upon every data recording, such as, the addresses of used parts of the OPC areas 511, 523.

Figure 6:
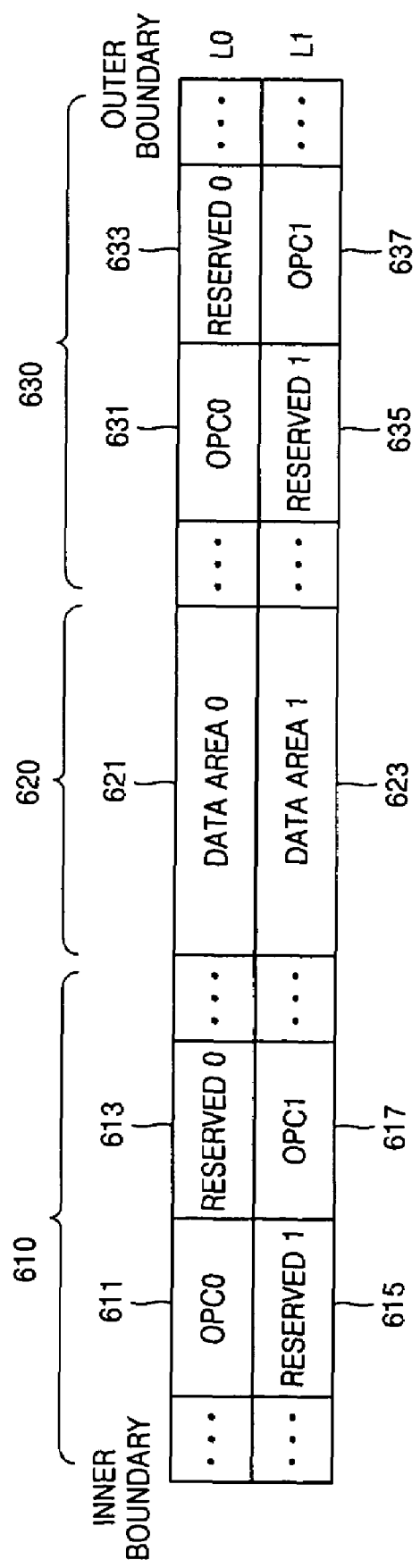
FIG. 6 illustrates a layout of a data area of a dual-layered information storage medium according to an embodiment of the present invention.

FIG. 6 illustrates an information storage medium according to another embodiment of the present invention. Considering the fact that characteristics of data recording in inner and outer boundaries of an information storage medium may be different, OPC areas 611, 631, 617, 637 are disposed in at least one of a lead-in area 610 and a lead-out area 630 which are disposed on opposite sides of a data area 620, respectively. In the first and second information storage layers L0 and L1, first and second OPC areas 611 and 617 of the lead-in area 610 and first and second OPC areas 631 and 637 of the lead-out area 630 may be disposed on both sides of third and fourth data areas 621 and 623 the data area 620 using one of the arrangements illustrated in FIGS. 2 through 5.

Figure 7:
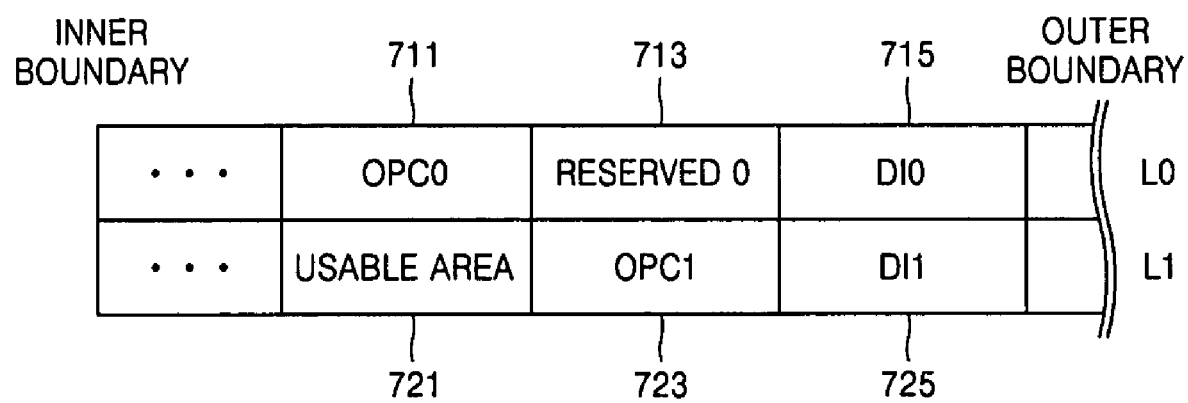
FIG. 7 illustrates a layout of a data area of a dual-layered information storage medium according to another embodiment of the present invention.

FIG. 7 illustrates an information storage medium according to another embodiment of the present invention. Considering the fact that degrees of influence of the OPCs executed in the first and second information storage layers L0 and L1 upon jitter characteristics of the first and second information storage layers L0 and L1, respectively, are different, a reserved area 713 is allocated in one of the first and second information storage layers L0 and L1, and a usable area 721 is allocated in the other information storage layer.

Referring to Table 1, the OPC in the second information storage layer L1 affects jitter characteristics more than the OPC in the first information storage layer L0. Of course, if the thickness of a space layer interposed between the first and second information storage layers L0 and L1 is changed or a structure of each information storage layer is changed, a phenomenon opposite to the above influencing phenomenon may occur. That is, the OPC in the first information storage layer L0 affects jitter characteristics more than the OPC in the second information storage layer L1. In the information storage medium of FIG. 7, the OPC in the second information storage layer L1 affects jitter characteristics more than the OPC in the first information storage layer L0.

In the information storage medium of FIG. 7, the first information storage layer L0 includes a first OPC area 711, a first reserved area 713, and a first DI area 715, and the second information storage layer L1 includes a usable area 721, a second OPC area 723, and a second DI area 725. The usable area 721 of the second information storage layer L1 faces the first OPC area 711 of the first information storage layer L0, which affects jitter characteristics less than the second OPC area 723 of the second information storage layer L1, and can be used to store data used for a special purpose, such as a purpose set by a user or a manufacturer. The first and second DI areas 715 and 725 are disposed within an identical radius of the information storage medium and store OPC information or information updated upon every data recording, such as, an address finally recorded in a user area or the like. The DI areas 715 and 725 may be replaced by map areas that are disposed within an identical radius of the information storage medium and that store information about the first and second OPC areas 711 and 723.

Areas arranged as illustrated in FIG. 7 can be disposed in both a lead-in area and a lead-out area or in one of a lead-in area and a lead-out area.

Figure 8:
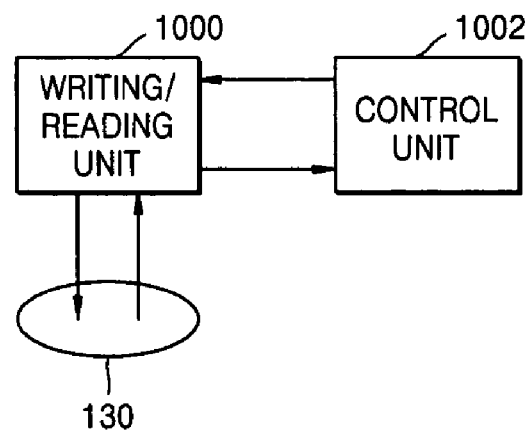
FIG. 8 is a block diagram of a recording and/or reproducing apparatus according to an embodiment of the present invention.

FIG. 8 is a block diagram of an optical recording and/or reproducing apparatus according to an embodiment of the present invention in which the information storage media of FIGS. 2-7 are implemented. Referring to FIG. 8, the recording and/or reproducing apparatus includes a writing/reading unit 1000 and a control unit 1002. The writing/reading unit 1000 reads from and writes to the information storage medium 130 according to commands from the control unit 1002. Here, the information storage medium 130 includes several embodiments shown in FIGS. 2 through 7 and the control unit 1002 controls data writing/reading operations of the writing/reading unit 1000 so as to minimize interference between a first optimal power control area in a first information storage layer and a second optimal power control area in a second information storage layer of the information storage medium 130.

Referring to FIG. 8, according to the control of the control unit 1002, the writing/reading unit 1000 records data on a disc 130, which is an information storage medium according to embodiments of the present invention, and reads out data in order to reproduce recorded data. The control unit 1002 controls the writing/reading unit 1000 so that the writing/reading unit 1000 records data in predetermined recording unit blocks, or processes data read by the writing/reading unit 1000 and obtains valid data. Reproducing refers to obtaining valid data by performing error correction for the read data, and is performed in predetermined units. The units for performing reproduction are referred to as reproducing unit blocks. A reproducing unit block corresponds to at least one recording unit block.

Figure 9:
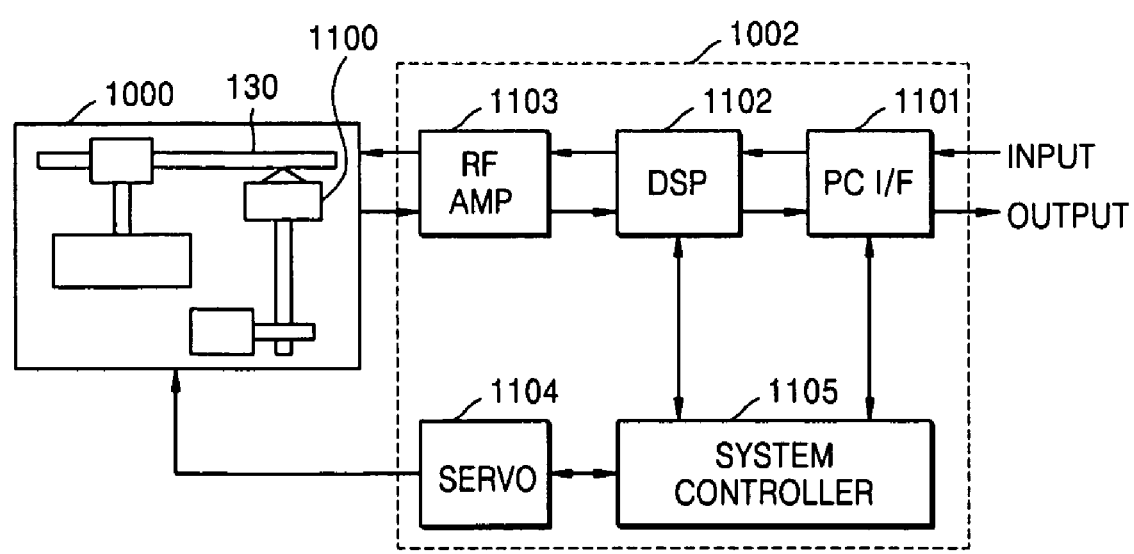
FIG. 9 is a more detailed block diagram of the optical recording and/or reproducing apparatus of FIG. 8.

FIG. 9 is a more detailed block diagram of the optical recording and/or reproducing apparatus of FIG. 8. Referring to FIG. 9, the information storage medium 130 is loaded in the writing/reading unit 1000. The recording and/or reproducing apparatus further includes an optical pickup 1100 that reads from and writes to the information storage medium 130. The control unit 1002 includes a PC I/F 1101, a DSP 1102, an RF AMP 1103, a servo 1104, and a system controller 1105, all of which constitute the control unit 1002 of FIG. 8.

In the data recording operation, the PC I/F 1101 receives a recording command with data to be recorded from a host. The DSP 1102 adds additional data such as a parity for error correction of the data received from the PC I/F 1101 and performs error correction and checking (ECC) encoding to generate an ECC block, which is an error correction block, and modulates the ECC block according to a predetermined method. The RF AMP 1103 converts the data output from the DSP 1102 into an RF signal. The pickup 1100 records the RF signal output from the RF AMP 1103 on the disc 130. The servo 1104 receives a command required for servo control from the system controller 1105 and servo-controls the pickup 1100.

In the data reproducing operation, the PC I/F 1101 receives a reproduction command from a host (not shown). The system controller 1105 performs the initialization required for reproduction. The pickup 1100 emits a laser beam onto the disc 130, obtains an optical signal by receiving a reflected beam from the disc 130, and outputs the optical signal. The RF AMP 1103 converts the optical signal output from the pickup 1100 into an RF signal and provides modulated data obtained from the RF signal to the DSP 1102 while providing a servo signal for control of the pickup 1100 obtained from the RF signal to the servo 1104. The DSP 1102 demodulates the modulated data, performs error correction and outputs the resulting data.

Meanwhile, the servo 1104 performs servo control of the pickup 1100, by using the servo signal received from the RF AMP 1103 and a command required for servo control received from the system controller 1105. The PC I/F 1101 transfers the data received from the DSP 1102 to the host.

The aforementioned OPC area arrangement embodiments are applicable to all information storage media regardless of whether a track of each information storage layer is spiraled from an inner boundary to an outer boundary or from the outer boundary to the inner boundary. The aforementioned OPC area arrangements are also applicable to all information storage media having a plurality of information storage layers regardless of whether an information storage layer to be reproduced first is either an information storage layer farthest from or closest to an optical pickup. For example, the aspects of the present invention described above are applicable to CD-R, CD-RW, DVD+RW, HD-DVD, Bluray, and Advanced Optical Disc (AOD) type information storage media. Although the OPC area arrangements have been described with regard to a dual-layered information storage medium having two information storage layers, they may be applied to information storage media having at least three information storage layers which are stacked one on another.

As described above, in an aspect of an information storage medium having a plurality of information storage layers, an OPC area of one information storage layer may be located to not directly face the OPC area of another information storage layer. Information about an OPC area (that is, OPC information) in one information storage layer is recorded in a reserved area of an adjacent information storage layer that faces the OPC area, and the directions of data recording in an OPC area of one information storage layer and a reserved area of another information storage layer that faces the OPC area are set to be opposite. That is, directions of the use of the OPC area and the reserved area are set to be opposite. Therefore, an influence of the OPC executed in an OPC area of one information storage layer upon another information storage layer is minimized, and the size of an actually usable area of the OPC area of each information storage layer varies depending on the use circumstances of the OPC area.

Alternatively, the OPC area of one information storage layer may be located to not directly face the OPC area of another information storage layer each other, and a map area for storing OPC information is included between the OPC area and a reserved area of each information storage layer according to an aspect of the invention. Therefore, when the OPC area of one information storage layer performs the OPC, this OPC does not affect another information storage layer. Also, an area of each information storage layer can be efficiently used, and a time required to perform the OPC can be shortened.

Alternatively, the OPC area of one information storage layer may be located with respect to an OPC area of another information storage layer such that the OPC areas do not face each other, and, considering the fact that degrees of influence of the OPC areas of two adjacent information storage layers upon jitter characteristics are different, a reserved area is allocated in only one of the two information storage layers, and a usable area is allocated in the other information storage layer according to an aspect of the invention. Therefore, when the OPC area of one information storage layer performs the OPC, this OPC does not affect another information storage layer, and an area of each information storage layer can be efficiently used.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An information storage medium having a lead-in area, a user data area and a lead-out area, the information storage medium comprising:
    an information storage layer comprising an optimal power control area for obtaining an optimal recording condition, a predetermined area other than the optimal power control area, and an information area having information regarding the optimal power control area,
    wherein the optimal power control area and the predetermined area are provided in the lead-in area of the information storage layer, and a direction of use of the optimal power control area is opposite to a direction of use of the predetermined area.

2. The information storage medium of claim 1, wherein the predetermined area is a reserved area.

3. The information storage medium of claim 1, wherein the information area is provided in the lead-in area of the information storage layer.

4. A recording apparatus to record data with respect to an information storage medium, in which the information storage medium comprises an information storage layer having an optimal power control area for obtaining an optimal recording condition, a predetermined area other than the optimal power control area, and an information area having information regarding the optimal power control area, and the optimal power control area and the predetermined area being provided in a lead-in area of the information storage layer, the recording apparatus comprising:
    an optical pickup which records data on the information storage medium; and
    a controller which controls the optical pickup to use the optimal power control area in a direction opposite to a direction of use of the predetermined area.

5. The apparatus of claim 4, wherein the predetermined area is a reserved area.

6. The apparatus of claim 4, wherein the information area is provided in the lead-in area of the information storage layer.

* * * * *